May 16, 1944.  S. N. BOBO  2,348,720
ADJUSTABLE BROILER GRID HOLDING RACK
Filed Jan. 25, 1940    2 Sheets-Sheet 1

INVENTOR
Stephen N. Bobo
BY Harry J. Lucke
HIS ATTORNEY

May 16, 1944.  S. N. BOBO  2,348,720
ADJUSTABLE BROILER GRID HOLDING RACK
Filed Jan. 25, 1940  2 Sheets-Sheet 2
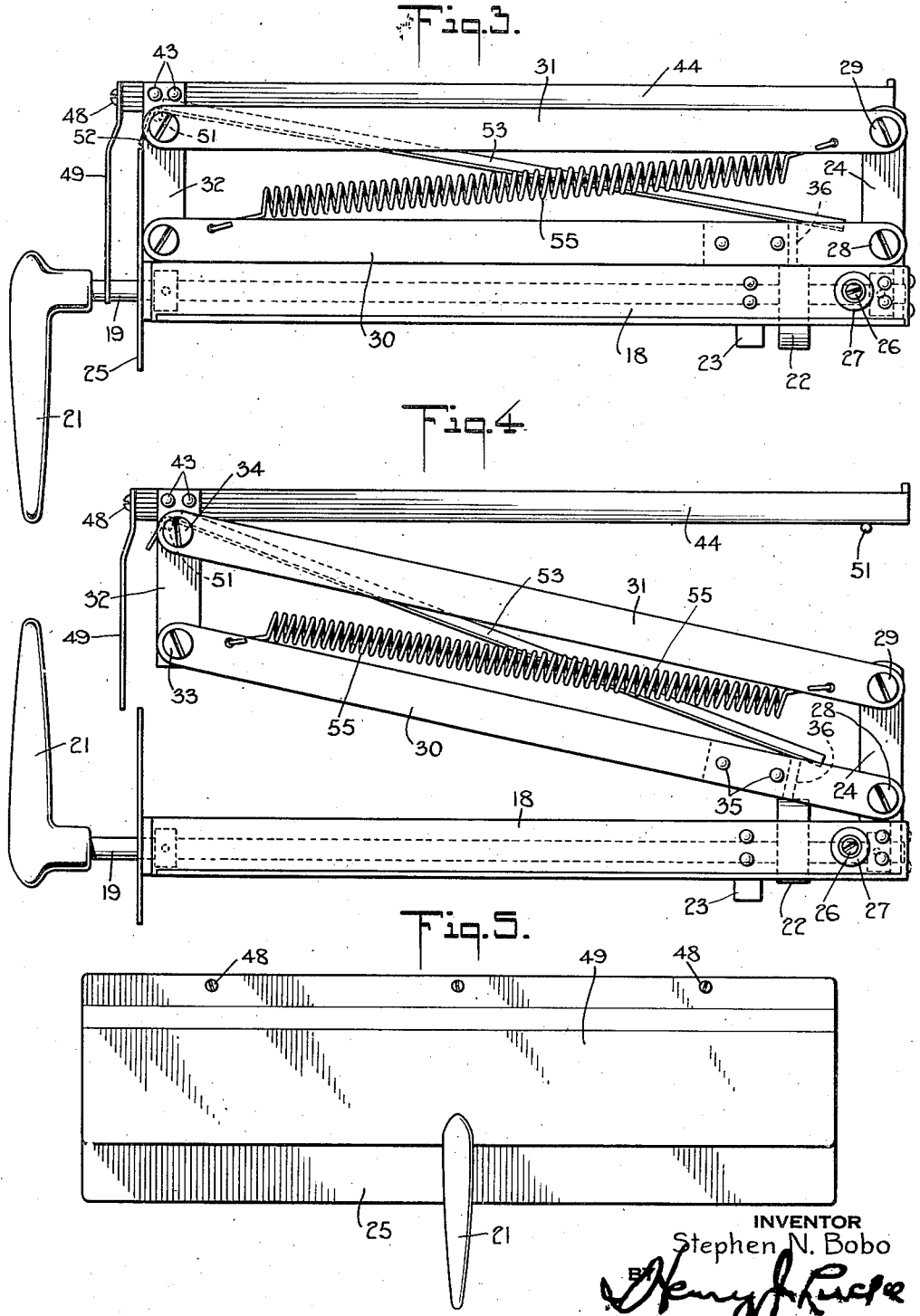
INVENTOR
Stephen N. Bobo Patented May 16, 1944

2,348,720

UNITED STATES PATENT OFFICE 2,348,720

ADJUSTABLE BROILER GRID HOLDING RACK

Stephen N. Bobo, New York, N. Y., assignor to Robert P. Sniffen, New York, N. Y.

Application January 25, 1940, Serial No. 315,472

2 Claims. (Cl. 126—337)

My present invention relates to broilers for food, and more particularly to an improved adjustable broiler grid holding rack.

In the modern broiler, which is preferably of the radiant type, the heat from the broiler unit is radiated downward onto food carried on a grid, which is turn is held in a rack. Upon the thickness of the food, and the amount of heat being radiated from the burner, will depend the distance the grid should be spaced from the burner to obtain a proper broiling. Various expedients have been employed to adjust the grid with respect to the burner, none of which appears to be successful.

In my present invention I mount the grid in a rack, mounted for reciprocating movement into and out of the zone of radiated heat from the burner, and such rack is made adjustable for height so as to enable the user to move the grid carried by such rack toward or from the source of heat in the burner. Also the grid carrying means of the rack is so connected in the rack structure as to maintain a substantially horizontal position at all times, and therefore to be moved toward and from the burner in planes perpendicularly to the line of flow of the radiant heat from such burner. Further, I have provided means for not only moving the grid carried by the rack upwardly toward the source of heat a predetermined distance, but have constructed the device to permit lowering of such grid holding element and returning the same to the former adjusted position.

A feature of my invention therefore is an improved grid carrying rack for radiant broilers.

Another feature of my invention is an improved means in a grid carying rack, for moving the grid toward and from the source of radiant heat in a direction perpendicularly to the flow of such radiant heat from the burner.

A further feature of my invention is an improved means in a grid carrying rack for radiant heaters, with means for maintaining the grid in parallel relation with respect to the face of the burner at all times.

In the accompanying drawings,

Fig. 3 is a side elevation of my improved device in the lowered or inoperative position;

Fig. 4 is a side elevation similar to Fig. 3 but with the grid carrying element moved to its uppermost or operated position, and Fig. 5 is a front elevation of the structure illustrated in Fig. 3.

Figure 1:
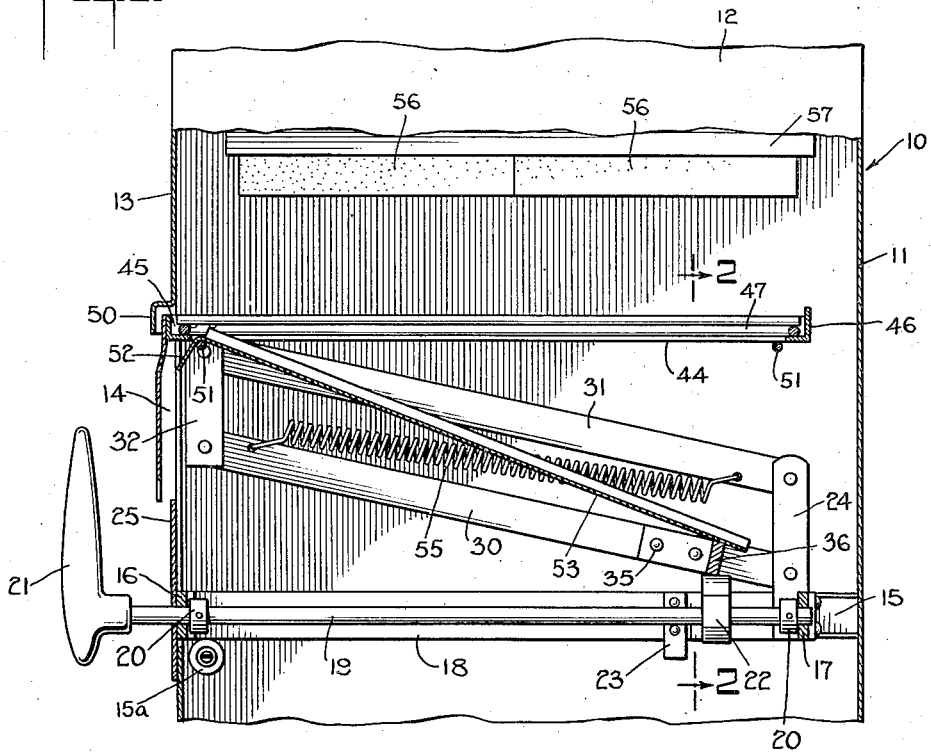
Fig. 1 is a sectional elevation of a part of a radiant broiler and showing my improved device, also in section, in operative relation to a radiant burner.

Referring to the drawings, 10 designates in its entirety a broiler casing comprising a rear plate 11, side plates 12 and a front plate 13. The front plate 13 is cut away to define an opening 14 which permits the insertion of my improved broiler rack and the operation thereof while so inserted. Secured to the side walls 12, adjacent the bottom of the opening 14 and lying in practically the same horizontal plane, are U-shaped tracks 15 in which the base of the broiler rack is slidably mounted.

The broiler rack comprises essentially a base, rectangular in form and composed of a front member 16, a rear member 17, and side members 18. Substantially centrally located along the length of the front and rear members 16 and 17 respectively are aligned bearings in which is rotatably mounted a shaft 19, such shaft being provided with collars 20 which prevent longitudinal movement of the shaft 19 in the bearings. Secured to the outer end of the shaft 20 is an operating handle 21. Secured to the shaft 19 adjacent the rear member 17 is a cam 22 for a purpose to be hereinafter described.

Secured to the side members 18 by riveting, or in any other suitable manner, are depending members 23 which act as stops to prevent too far an outward movement of the base above described through the hole 14, as such members 23 will normally engage with the rear face of the front wall 13 at the bottom of the opening 14. Secured to the rear ends of the side members 18 by riveting or in any other suitable manner, and extending upwardly from such side members, are the standards 24. Secured to the front member 16 of the base is a finish plate 25 which engages with the front face 13 to limit the inward movement of the base with respect to the broiler casing 10.

Secured to the side frame members 18 adjacent the rear end thereof are bearing studs 26, and on each of the studs is rotatably mounted a roller 27 which rides in the U-shaped track 15 and permits easy sliding movement of the base on such tracks.

The uprights 24 are by necessity arranged parallel to and spaced apart from each other. In each of the uprights 24 is arranged a lowerly arranged bearing stud 28 and an upperly arranged bearing stud 29. On the bearing studs 28 is pivotally attached one end of the bars 30, while on the upperly arranged studs or shafts 29 is pivotally attached one end of the bars 31. There are thus two sets of bearings, one set for each of the bearing standards 24. The bars 30 and 31 are of equal length and at the end of such bars remote from the bearing standard 24 are pivotally attached the members 32. The points of attachment of the bars 30 and 31 on the member 32 are designated 33 for the bars 30, and 34 for the bars 31. The distance between the shafts 33 and 34 is equal to the distance between the shafts 28 and 29.

The above construction provides a parallel motion mechanism whereby if the bars 30 and 31 are rotated about their respective shafts 28 and 29 the member 32 will be moved upwardly, and will at all times remain parallel to the bearing standards 24. Extending between the bar 30 and secured to such bars in any suitable manner, as by rivets 35, is a crossbrace 36 which constrains the spaced bars 30 and also the spaced bars 31 to move as a unit.

The cam 22 which is secured to the shaft 19 adjacent to the end of such shaft remote from the operating handle 21 is directly below the crossbrace 36. The cam 22 is so shaped as to have thereon separate and distinct surfaces which will cause the brace 36 to be moved upwardly and held upwardly in a plurality of different positions. Also the cam 22 has a portion thereof which will permit the crossbrace 36 and therefore the member associated therewith to move downwardly into a lowermost and inoperative position. This latter position is made possible by the portion or face 38, such portion 38 being in engagement with the crossbrace 36 in Figure 3, where the side bars 30 and 31 are shown in their lowermost position with respect to the side frame members 18 of the rectangular base. On the cam 22 there are also the faces 39 which move the crossbrace and parts associated therewith to an upper intermediate position. Further there is the face 40 which moves the crossbrace 36 and associated members upwardly to the upper limit of movement desired. This face is shown in engagement with the crossbrace 36 in front elevation in Fig. 2 and in side elevation in Figures 1 and 4. This position of the face 40 of the cam 22 results, as clearly shown in Figures 1 and 4, in raising the vertically arranged members 32 to their uppermost position.

Figure 2:
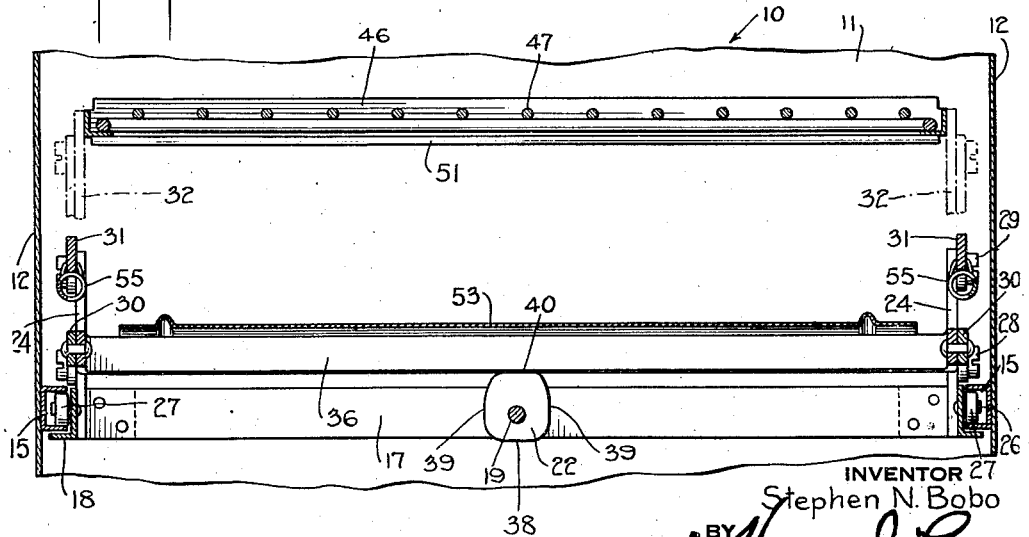
Fig. 2 is a sectional elevation taken on the line 2—2 of Fig. 1.

Secured to the upper ends of the members 32 by rivets 43 are the side members 44 of a grid supporting framework. This framework comprises the side members 44, and the front and rear members 45 and 46 respectively. The members 44, 45 and 46 are angular in cross-section as shown clearly in Figure 1 and form a support for a grid 47. Secured to the front bar 45, by screws 48 or in any other suitable manner, is a plate or apron 49. The upper end of the plate or apron 49, when the framework above described is in its uppermost position, or in the position shown in Figure 1, is housed within a recess 50 formed in the front wall 13 of the broiler casing. Secured to the underside of the side members 44 of the grid supporting framework and arranged parallel to and adjacent the front and rear members 45 and 46 thereof are rods 51 which act as supports for the hooked end 52 of a drip pan 53.

In the drawings I have shown the coil spring 55 connecting the parallelly arranged bars 30 and 31, which tend to rotate such bars about their respective pivots in a clockwise direction, and thereby assist in moving the grid supporting frame to the uppermost position as shown in Figures 1 and 4. The utilization of such spring 55, however, is merely a matter of convenience or desire, and the device appears to work equally well without the use of such springs.

When in its uppermost position, as shown in Figure 1, the grid 47 on which the food to be broiled is placed, is in its nearest position to the radiant elements 56 of the broiler unit 57, and the smoke and odor from unconsumed gases and cooking food passes upwardly through the broiler unit enclosing casing without passing outward into the room through the opening 14 in the front face thereof. If the position of the grid supporting framework is too close in its uppermost position to the radiant elements 56 the operator, by rotating the shaft 19 either to the right or to the left, may bring either one or the other of the faces 39 of the cam 22 into engagement with the crossbrace 36, whereupon the weight of the device will rotate the bars 30 and 31 about their respective axes to lower the crossbrace 36 and framework carried thereby, and thus lower the grid 47 from its position shown in Figure 1 to a position intermediate such figure and that shown in Figure 3.

After the broiling operation is completed the operator, by moving the handle 21, rotates the shaft 19 so as to bring the face 38 of the cam 22 into engagement with the crossbar 36, as shown in Figure 3, and thus allows the grid 47 to move to its lowermost position and permits the operator to then pull the entire device outwardly from the enclosing flame of the broiler, the rollers 27 in this action rolling in the U-shaped tracks 15, while the side members 18 roll in the rollers 15a, and positioning the grid, with the cooked food thereon, in such a position as to permit ready removal of such food. Too far a withdrawal of the device is prevented by the stops 23 engaging with the lower edge of the opening 14 in the front face 13 of the broiler casing.

Whereas this invention has been described with reference to specific forms thereof it will be understood that many changes and modifications may be made without departing from the spirit of the invention.

I claim:

1. In combination, a stove or the like having a chamber provided with a heating element, spaced fixed uprights secured within said chamber, a parallel motion mechanism including a pair of spaced arm members pivotally secured at one end to each said fixed upright and a link pivotally secured to each said pair of arm members at an opposite end thereof, a food-supporting frame secured at one end to said links for movement therewith, a crossbrace extending between and rigidly secured to opposite arm members adjacent said fixed uprights at a level beneath said food-supporting frame, rotatable cam means arranged to operate upon said crossbrace whereby said crossbrace acts as a cam follower to move said parallel motion mechanism and its therewith connected food-supporting frame at variant levels with respect to said heating element upon rotation of said cam, said cam having a plurality of peripheral surfaces each having a different center of curvature and each surface having a radius of curvature greater than the distance from that surface to the cam's axis of rotation, and means disposed exteriorly of said chamber for rotating said cam means.

2. In combination with a stove or the like having a chamber and heating element therein, a quadrilateral base frame removably positioned within said chamber, fixed uprights secured to each side of said base frame adjacent an end thereof, a parallel motion mechanism including a pair of spaced arm members pivotally secured at one end to each of said fixed uprights, a crossbrace extending between and rigidly secured to opposite arm members adjacent said uprights, a link pivotally secured to each of said pair of arm members at the free ends thereof, a food-carrying frame fixedly secured to said links for movement therewith toward or away from said heating element according to the movement of said parallel motion mechanism, a rotatable cam having a plurality of relatively flat peripheral surfaces each of said surfaces being spaced at a different distance from the axis of rotation of said cam, said cam being rotatably mounted beneath said crossbrace, and means accessible exteriorly of said chamber for rotating said cam, said crossbrace engaging with the periphery of said cam to act as a cam follower, whereby upon rotation of said cam, said parallel motion mechanism and therewith supported food-carrying frame is moved with respect to said heating element and may be held in position according to the peripheral surface of the cam in engagement with the said crossbrace.

STEPHEN N. BOBO.